United States Patent [19]

Kietzman et al.

[11] 3,870,426

[45] Mar. 11, 1975

[54] METHOD OF PROTECTING PAVEMENT FROM CORROSIVE SALTS AND AN IMPERMEABLE PAVEMENT MEMBRANE AND PAVEMENT OVERLAY FOR USE IN SAID METHOD

[75] Inventors: John Howard Kietzman, Golden; Mario Peter Tocci, Englewood, both of Colo.

[73] Assignee: Johns-Manville Corporation, Denver, Colo.

[22] Filed: Sept. 10, 1973

[21] Appl. No.: 395,892

Related U.S. Application Data

[63] Continuation-in-part of Ser. No. 148,205, May 28, 1971, abandoned.

[52] U.S. Cl.................. 404/82, 106/282, 404/17
[51] Int. Cl............................................ E01c 19/00
[58] Field of Search .......... 106/282, 202, 277, 281, 106/172, 87; 404/72, 82, 17; 264/31; 260/758

[56] References Cited
UNITED STATES PATENTS

| | | | |
|---|---|---|---|
| 88,516 | 3/1869 | Russell | 106/202 |
| 607,884 | 7/1898 | Richardson | 404/32 X |
| 656,094 | 8/1900 | DeCaudemberg | 260/758 |
| 779,604 | 1/1905 | Jones et al. | 106/281 |
| 1,021,569 | 3/1912 | Bladen | 106/172 |
| 1,230,085 | 6/1917 | Ashenhurst | 106/87 |
| 1,265,259 | 5/1918 | Schutte | 106/282 |
| 1,576,045 | 3/1926 | Greene | 404/32 X |
| 1,684,671 | 9/1928 | Hayden | 264/31 |
| 2,413,901 | 1/1947 | Abernathy | 404/32 X |

Primary Examiner—Nile C. Byers, Jr.
Attorney, Agent, or Firm—Robert M. Krone; John H. Miller

[57] ABSTRACT

Salts used on highways and bridges to melt snow and ice combine with the melted snow or ice to form corrosive solutions which attack the pavement and the steel reinforcement therein causing severe deterioration. A method has been discovered for sealing the top surface of pavements to prevent the penetration of such corrosive salts thus eliminating the problem of deterioration. The method utilizes an impermeable membrane comprising asbestos fibers, asphalt and relatively fine aggregate. This membrane may be in the form of preformed sheets or it may be laid down on the site as a hot mix using conventional paving machines. An asphalt concrete wearing course is applied over the membrane and the heat from said wearing course and the rolling compaction of the wearing course cooperate in rendering the membrane impermeable. The method requires a minimum effort in preparing the pavement for the sealing membrane, requires a minimum of time to complete and thus a minimum in traffic delay and offers a further advantage in that the membrane itself can be driven on temporarily to relieve traffic congestion prior to the application of the wearing course. This method has proven especially advantageous in protecting portland cement concrete pavements in bridge decks from deterioration.

27 Claims, No Drawings

METHOD OF PROTECTING PAVEMENT FROM CORROSIVE SALTS AND AN IMPERMEABLE PAVEMENT MEMBRANE AND PAVEMENT OVERLAY FOR USE IN SAID METHOD

BACKGROUND OF THE INVENTION

This application is a Continuation-in-part of application Ser. No. 148,205, filed May 28, 1971 and now abandoned.

FIELD OF THE INVENTION

This invention relates to protection for pavements, particularly concrete pavements. The invention more specifically relates to impermeable membranes for and the method of protecting concrete pavements, such as portland cement concrete pavements and particularly portland cement concrete bridge decks, from chemical and physical deterioration.

DESCRIPTION OF PRIOR ART

Deterioration of concrete pavements, particularly portland cement concrete, has for many years been a serious problem. In approximately the past 20 years this problem has become more acute in northern areas due to the continuing and growing use of deicing salts on highways and bridges. Such salts, usually sodium chloride or calcium chloride, in the presence of moisture have been identified as a cause of structural deterioration of portland cement concrete pavement. Due to its generally porous structure, salts and water have been able to penetrate into the reinforced portland cement concrete structure. Deterioration has also been shown to result from defects in construction of the pavement and from the effects of freeze-thaw cycles. Both concrete bridge decks and roadways are susceptible to such deterioration, although the former continues to be more of a major problem, due to the resulting structural damage, large repair and maintenance costs and safety factors.

Such deterioration often results in cracking, scaling and spalling of portland cement concrete pavements. Scaling is local flaking or peeling away of the near surface portion of the concrete. Spalling is the formation of depressions caused by separation of the surface layer. Particularly with portland cement concrete bridge decks, metal reinforcements, usually made of steel, are provided in the concrete layer. Deterioration of the concrete frequently has been caused by corrosion of the metal reinforcements which results in spalling and a decrease in strength. Even if there are no cracks in the concrete, water and salts can penetrate porous concrete causing corrosion of the reinforcing steel. Spalling is frequently more troublesome than other types of deterioration in bridge decks because the deck is weakened locally resulting in exposure of the reinforcement, poor riding quality and difficulty in repair. Deterioration in any form of course weakens the concrete pavement.

For a long time efforts have been directed to finding ways of preventing or limiting deterioration of concrete surfaces. Various measures have been taken to prevent deterioration on bridge decks including control over the constituent parts of the concrete, control over construction methods and the provision of waterproof membranes for the concrete. The need for such waterproof, impermeable membranes or interlayers has been recognized since the destruction-causing agents are carried to the concrete by water and much work has been done in this area to fulfill such need.

Many types of membranes have been placed on bridge decks to provide the necessary impermeability and are usually covered with standard asphalt concrete pavement overlays as a wearing course. These membranes have been shown to be impermeable as placed and include soft rubber preformed sheets or resinous layers with or without reinforcement. However, problems attendant with such membranes have limited their use. Such problems include the necessity for special treatment of the concrete deck (sand-blasting and/or acid washing), difficulty in placing and curing at low ambient temperatures, bond failure, lateral migration of salt solutions at the concrete-membrane interface, inability to sustain construction traffic or gouging by paver wheels, excessive traffic delays and high cost.

A frequently used membrane has been glass fabric mopped with several coats of coal-tar pitch or other sealants. Glass fabric membranes have been applied to bridge decks by first cleaning the surface of the concrete by sand-blasting of acid washing, applying a primer, applying two layers of coal-tar pitch, a layer of fiber glass fabric, followed by another coaltar layer, another fiber glass fabric and still another coal-tar layer. The membrane is then covered with an overlay of a bituminous bond coat and an asphalt wearing surface. It will be appreciated that this system is complex and requires considerable manpower and handwork. Moreover, the cure times for the several layers are excessive and the cost is high.

Coal-tar and epoxy systems have also been used to some extent to provide an impermeable membrane for concrete bridge decks. The deck must first be carefully cleaned by sand-blasting or acid cleaning. A mixture of coal-tar and epoxy is then deposited on the deck and sand is applied over the mixture to improve bonding to the overlying wear layers. Problems with this membrane include sensitivity to weather during application, extensive bridge deck preparation of high cost.

With the heretofore used impermeable membranes, traffic delays have been a serious problem for two reasons. First, it is estimated that costs for traffic control around the membrane placing area are often equal to the costs of the membrane itself and its application. Secondly, the previous membranes required closing of traffic in at least one lane for extensive periods of time due to the lengthy application process, the lengthy cure times and the inability of the membrane to sustain temporary traffic. Lane blockage due to the bridge deck protection operations can cause serious traffic delays and accidents on heavily travelled roads and bridges. It would thus be desirable to have a membrane layer which can be applied without serious traffic delays. Aside from the above-mentioned problems, such membranes, while impermeable as placed, have often lost their effectiveness as a water barrier during the application of the wearing course or over a period of time. Because the asphalt wearing courses are water permeable due to their void-containing structure, the necessity of providing a completely liquid water impermeable membrane layer which will maintain its impermeablility has been recognized in the past. It has also been recognized that such membranes should be stable (that is, resistant to plastic flow during weather use) and crackresistant so as to maintain their impermeability.

It is apparent that there is a definite need for an impermeable membrane for bridge decks and other road surfaces which eliminates most or all of the abovementioned problems, as well as an impermeable pavement overlay system and a method of placing such a membrane in an economically attractive manner from the standpoint of materials cost, length of the application process and traffic delays.

It is an object of this invention to provide such a membrane, pavement overlay system and a method of application.

BRIEF SUMMARY OF THE INVENTION

This invention provides an economical impermeable membrane or interlayer for pavements, particularly bridge decks, which protects the pavement from the effects of weather and deicing salts and eliminates problems connected with previously used membranes. This impermeable membrane requires little surface preparation, can be applied at ambient temperatures common for asphalt pavement construction, can sustain construction as well as temporary traffic, can be applied by conventional paving techniques with minimal traffic delays and at low cost. This invention further provides a method of protecting a pavement, such as a bridge deck, by applying the impermeable membrane of this invention to the pavement and then applying a wearing course over the membrane. In addition, this invention provides an impermeable pavement overlay comprising the membrane of this invention covered with a wearing course.

The membrane of this invention comprises an asbestos-asphalt mix which can be applied to pavement surfaces in the form of either a hot mix using conventional paving machines or preformed sheets of the same composition as the hot mix. The mix comprises asbestos fibers, asphalt and fine aggregate in a particular gradation and can be applied as a thin layer over concrete pavements, such as portland cement concrete which may be reinforced with metal. For example, the membrane may be applied over steel reinforced portland cement concrete bridge decks. The hot mix or preformed sheets may be applied as a layer as thin as about one-sixteenth inch up to about 1 inch thick, however, due to irregularities in the pavement surface the layer should normally be applied at least as thick as one-eigth inch. This thin layer can be compacted to impermeability during the compaction of a subsequently applied wearing course to provide deterioration protection for the underlying pavement. The membrane also provides a stable and crack-resistant layer. The membrane layer is provided with an overlying asphalt concrete wearing course to form the pavement overlay of this invention. The method of this invention more particularly comprises applying a thin asbestosasphalt membrane layer to a pavement and then applying a thicker asphalt concrete layer over the membrane layer to provide a wearing course and to compact the membrane layer to a state of impermeability. This latter step is important because due to irregularities in the pavement surface it is not practical to directly roll the membrane layer sufficiently to render it uniformly impermeable. The roller bridges between the high points on the pavement surface resulting in insufficient roller pressure on the membrane portions between the high points to compact them to impermeability. The term "impermeable" as used in the specification and claims means impermeable to water in liquid form.

DETAILED DESCRIPTION AND PREFERRED EMBODIMENTS

The membrane interlayer of this invention comprises a high asphalt content composition, comprising asbestos fibers, asphalt and fine aggregate. The aggregate is a fine graded aggregate and preferably comprises both angular and round shaped particles, such as crushed stone screenings and natural sand. Mineral aggregates which are inherently porous should be excluded from the pavement mix. Such porous mineral aggregates include blast furnace slag, expanded shale, porous limestone, light weight aggregates and weathered stone. The natural sand used in this invention may comprise siliceous sand. The gradation of aggregate size is important to the properties of the membrane layer. The aggregate is graded such that about 70 to about 100% be weight passes through a No. 10 U.S. Standard Sieve Screen and at least about 10% by weight passes through a NO. 200 U.S. Standard Sieve Screen. All sieve screens referred to in the specification and claims are U.S. Standard Sieve Screens unless otherwise stated. If required, mineral filler, such as rock dust filler, may be added to the aggregate to provide the necessary fines requirement (that is, the percent aggregate passing through a No. 200 sieve).

The asbestos fiber is preferably of the chrysotile variety and short fibers are preferred. The fiber is preferably of a length defined by Q.A.M.A. Classification System Groups 5 to 7; Q.A.M.A. being the abbreviation of Quebec Asbestos Mining Association.

The asphalt should be steam-refined penetration grade asphalt of a penetration of about 40 to about 100, or equivalent viscosity classification. Asphalt should be present in an amount above about 12% by weight of the total weight of the mix. All parts and percentages listed in the specification and claims are weight percentages unless otherwise stated.

As used in the specification and claims, the term "penetration" refers to the consistency of bituminous material expressed as the distance in tenths of a millimeter that a standard needle penetrates vertically into a sample of the material under fixed conditions of temperature, load and time. Penetration is measured in accordance with ASTM Test D5-65. Unless otherwise stated, the conditions of the test are a temperature of 25°C (77°F), a load of 100 grams and a time of 5 seconds. For convenience, the units of penetration are commonly omitted when referring to penetration, but it should be understood that the units are those indicated above.

The membrane may, for example, comprise the following approximate weight percentages:

| | |
|---|---|
| asphalt | – 20% |
| asbestos fiber | 4 – 10% |
| aggregate | 70 – 84% |

The asbestos fiber/asphalt weight ratio has been found to affect the stability and stiffness or hardening of the composition. The use of asbestos allows an increase in the asphalt content to the point where an impermeable layer is always assured and where the asphalt-asbestos layer between the fine aggregate grains provides the necessary flexibility for crack-resistance and resistance to oxidation hardening of the asphalt. Stable, crack-resistant and impermeable membranes may be formed from compositions in which the asbestos fiber/asphalt ratio ranges from about 0.30 to about 0.50. The aggregate gradation should be as stated above.

More particularly preferred ranges are approximately as follows:

| | |
|---|---|
| asphalt | 14 – 18% |
| asbestos fiber | 5 – 7% |
| aggregate | 75 – 81% |
| asbestos fiber/asphalt ratio: | 0.35 to 0.45 |

It is preferred to use an aggregate mixture of crushed stone screenings and natural siliceous sand. It is also preferred to use asphalt of about 60 to about 85 penetration, or equivalent viscosity classification. It is more particularly preferred to use asphalt of about 60 to about 70 penetration.

| | |
|---|---|
| asphalt (60–70 penetration) | 16% |
| asbestos fiber, Q.A.M.A. Grade 7M | 6% |
| aggregate | 78% |

The aggregate in this specific preferred embodiment comprises crushed stone screenings in the approximate range of 40 to 60% by weight and natural sand in the approximate range of 60 to 40%. The aggregate has the following approximate gradation:

| Sieve Size | % Passing |
|---|---|
| ¼" (or No.4) | 100 |
| No. 10 | 80 – 95 |
| No. 40 | 40 – 65 |
| No. 80 | 20 – 40 |
| No. 200 | 10 – 16 |

Within the ranges of the above-mentioned parameters, it has been found that when the composition is applied as a membrane to protect pavements, the membrane exhibits impermeability, crack-resistance and stability. It has further been found that at asbestos fiber/asphalt ratios below about 0.30. the membrane stability falls below acceptable levels for heavy traffic and at asbestos fiber/asphalt ratios above about 0.50, the membrane crack-resistance decreases below acceptable levels. As disclosed above, it is preferred to limit the asbestos fiber/asphalt ratio to the range of about 0.35 to about 0.45 to achieve optimum crack-resistance, stability and impermeability.

The asphalt content of the membrane composition represents a considerable increase over what is normally allowed by the above referred to aggregate gradation in conventional asphalt compositions without asbestos fiber. Such increase can be in the range of about 40 to about 50%, and higher. This increase in asphalt content contributes to the impermeability, durability (resistance to asphalt hardening) and crackresistance exhibited by the present membrane. The asbestos fiber contributes to the stability, crackresistance and toughness of the composition. The aggregate gradation also is an important factor in the properties of the membrane. If too much coarse aggregate is present, that is, if less than about 70% passes a No. 10 screen, the membrane composition becomes more difficult to compact and may be permeable. If less than about 10% fines are present (particles passing No. 200 sieve screen), the pavement may also become unstable and/or be permeable. If too much fine aggregate is present, the hot mix becomes too cohesive to be conveniently placed by paving machines. The preferred range of particles passing No. 200 sieve screen is 10 to 12%.

The membrane layer is preferably applied to a pavement surface as a hot mix. The aggregate should be preheated to the temperature required to achieve a final mix temperature of about 325°F. In formulating a final mix temperature of about 325°F. In formulating the membrane by batch mixing, the aggregate (and filler, if necessary) is preheated and added to a conventional pavement pugmill. The asbestos fiber should then be added to the pugmill and the materials should be dry mixed for a period of at least about 30 seconds. The fiber may be added to the pugmill in a plastic bag (usually polyethylene) in which it is commonly packed, but it should be understood that the asbestos fiber can be introduced into the pugmill in any desirable manner. Asphalt should then be added to the pugmill and the complete mixture should be mixed for at least about 45 seconds or as long as necessary for complete coating of the aggregate and asbestos fibers.

In applying the membrane material of this invention as a hot mix to a concrete pavement, such as a bridge deck surface, the surface should be clean of all dust, dirt, grit, grease spots and other surface debris. This can be done by sweeping to vacuum cleaning. Sandblasting, acid washing or other lengthy, special treatments of the concrete surface are not required. Small patch work with the membrane mixture may be necessary to fill holes or rough areas greater than about one-half inch in depth; such application may be done by hand, followed by tamping of the mix.

It is usually desirable to apply a tack coat prior to paving with the membrane mix in order to increase the bond between the underlying pavement and the membrane. A suitable tack coat is a rapid setting asphalt emulsion comprising 85 to 100 penetration asphalt and water. Emulsion based tack coats are preferred over solvent based tack coats because the latter may tend to form blisters caused by solvents trapped under the membrane. The tack coat may be applied to the concrete surface by standard spray equipment. It is preferred to spray the emulsion at a rate to yield an asphalt residue of between about 0.05 gal/yd$^2$ and 0.10 gal/yd$^2$. After the tack coat is applied, it is allowed to completely dry before the membrane layer is applied.

The membrane mixture should be applied at a minimum temperature of about 285°F, as measured before paving, usually in the paving truck. More preferably, the membrane mixture should be at least about 300°F and a range of 325°F to 350°F is most preferred. The temperature may range to about 375°F or higher. Standard paving machines capable of placing "sheet" or "sand" asphalt hot mixes may be used to apply the membrane mixture. The membrane should be applied to a depth of from about one-eighth inch to about 1 inch for reasons discussed below. A nominal thickness of about one-half inch is presently preferred with coverage being no less than about one-fourth inch thickness in any area exceeding 1 sq. ft. or below about 40 lb/yd$^2$. It is preferred to place the membrane on the pavement at ambient temperatures of about 50°F and above. It is preferred to maintain the paver speed at levels below 20 feet per minute.

The membrane pavement may be rolled, if desired. If rolling is done, a three-wheel roller or any other conventional roller may be applied to the membrane mat immediately behind the paver, or as close as allowed by paving operations. The roller should be uniformly wetted with water or an acceptable solution.

The membrane mat can be sanded before the first or second roller pass using course, dry sand or stone chips spread uniformly over the surface in an amount of 1 to 2 lbs/yd$^2$. This is done to prevent pickup of the membrane by the wheels of the paver or construction trucks. It also provides a satisfactory surface for normal road traffic until the wear course is applied. If the membrane course is sufficiently thick, e.g., about 1 inch or thicker, this technique can eliminate the need for a wear course. It has been found that a thick membrane having a sanded surface can be directly rolled to impermeability.

After the membrane pavement has been applied, an asphalt concrete wearing course should be applied thereover to an acceptable depth. It is preferred to apply the wearing course to a nominal thickness of about 1 inch to about 2 inches. The asphalt concrete wearing course may be any conventional asphalt concrete mix and may comprise asphalt and aggregate in the amounts commonly used. For example, Type IV mixes recommended by The Asphalt Institute (Construction Specifications for Asphalt Concrete and Other Plant-Mix Types, 4th Ed., November 1969, SS-1) for use as surface base may be used as the wearing course. Such Type VI mixes have normal asphalt cement contents of 3.5 to 7%. The aggregate used for the wearing course is generally coarser than the membrane aggregate. The wearing course should be applied at a temperature of at least about 250°F., preferably at least about 275°F, as measured before paving, for the reasons discusssed below.

A light tack coat may be required on top of the membrane layer before application of the wearing course if a visible coating of dust or dirt cover the layer or if the application of the wearing course is delayed for more than about 48 hours. This tack coat may also be of a conventional asphalt emulsion, approved for standard pavement construction, and should be applied at a standard rate.

The wearing course may also be applied by standard paving machines, properly adjusted. After application of the asphalt concrete wearing course, the wearing course is rolled in conventional manner, such as by a three-wheel roller, soon after placement of the pavement. The application of a hot wearing course layer and the application of pressure by the rollers, or other pressure force, result in compaction or densification of the membrane layer to impermeability. The membrane layer, which is often cooled by the time the wearing course is applied, is reheated by the hot wearing course layer applied thereto and the pressure applied to the wearing course compacts or densifies the reheated membrane layer, decreasing the amount of voids in the membrane and bringing the membrane to an impermeable state. For this reason, the temperature of the wearing course, as applied, should not be less than about 275°F for a nominal one-half inch thick membrane. It is also thought that as the thickness of the membrane is increased, the depth of heat penetration from the wearing course decreases. For a membrane thickness of about 1 inch, a nominal 1½ inch thick wearing layer applied at about 275°F will usually result in only partial compaction of the membrane, but sufficient compaction to yield impermeability for most conditions. For membrane thicknesses above about 1 inch, less than full compaction usually results in membranes which are permeable. For membrane thicknesses of one-sixteenth inch up to 1 inch, it has been found that heat from the hot wearing course penetrates through the entire membrane layer and renders the layer capable of being compacted to impermeability by the pressure applied to the wearing course.

As mentioned previously, the membrane thickness should be in the range of about one-eighth inch to about 1 inch. Above a thickness of about 1 inch, the membrane stability decreases below acceptable levels. Furthermore, the costs of thicker membrane layers would be excessive. Thicknesses below about one-eighth inch may not always be suitable because impermeability is difficult to attain due to irregularities in the pavement surface. When using very thin membrane layers the diameters of the largest particles in the membrane mix must be less than the desired membrane thickness. It is preferred to apply the membrane layer in a thickness of at least about one-fourth inch, with an upper preferred thickness limit of about one-half inch nominal thickness.

The cost of the hot mix membrane pavement of this invention is relatively inexpensive and approximately one-half the cost of glass fabric membrane systems which are currently used in some locations.

Although the membrane material of this invention has particular utility as a protective layer for bridge decks formed of reinforced portland cement concrete, the membrane may be used to protect other types of pavement, including roadways formed of portland cement concrete, asphalt concrete or other roadway pavements, and bridge decks formed of unreinforced portland cement concrete as well as other pavement materials. For example, the low cost membrane of this invention may be used as an interlayer on portland cement concrete highways in place of a thicker binder course. In addition, the membrane may be used as an impermeable membrane interlayer in bituminous concrete pavements to prevent water from penetrating to the base course and softening the base or causing frost heaving. For example, the membrane may be used as an impermeable interlayer for asphalt concrete resurfacing to prevent reflection-cracking in the wheel paths (propagation of cracks in the wheel tracks to the underlying pavement). Reflection-cracking can result in water migrating down to the subbase and decreasing its strength.

Thin layers of the asbestos-asphalt composition, within the above specified thickness ranges, are capable of providing an impermeable membrane to protect an underlying pavement. Thicker layers would, of course, be more expensive. In addition, by providing a thin membrane layer, the membrane does not add excessive weight to the pavement which may be of importance in bridge decks. Although such thin layers cool quickly after placement, they are capable of being reheated and compacted by a hot wearing course layer. This feature suggests that the membrane could be further compacted or recompacted on hot summer days by normal truck and heavy vehicle traffic to heal any minute cracks that might have developed in the membrane.

The following examples, given only for purposes of illustration, indicate the water proofing properties of the products of this invention, as well as the method of this invention.

EXAMPLE I

An asphalt concrete roadway highway exit ramp was provided with an impermeable membrane of asbestos-asphalt composition in the following manner. The roadway surface was swept clean to remove surface debris. A hot mix of the following formula was prepared and applied to the surface:

|  | Wt. % |
|---|---|
| aggregate | |
| stone screenings (traprock) | 35 |
| natural sand | 34 |
| mineral filler (rock dust) | 10 |
| asphalt (60–70 penetration) | 15 |
| asbestos fiber (J-M "ASBALTIC") | 6 |
| | 100 |

The J-M "ASBALTIC" asbestos fiber was a short asbestos fiber of the chrysotile variety, Q.A.M.A. Grade 7M.

The aggregate gradation was as follows:

| Sieve Size | % Passing |
|---|---|
| ⅜ inch | 100 |
| No. 4 | 98 |
| No. 10 | 95 |
| No. 40 | 45 |
| No. 80 | 20 |
| No. 200 | 10 |

The above gradation was determined by ASTM Sieve Test C–136 performed on a plant mix sample after asphalt extraction by ASTM Test D–2172. The aggregate was added to a pugmill and then the asbestos fibers in polyethylene bags were added. These materials were dry mixed at 320°F for 60 seconds. The asphalt was then added to the pugmill and the composition was wet mixed for 60 seconds. Two batches each of 1 ton were made. A tack coat of RS–1 asphalt emulsion was coated on the roadway. After the tack coat had dried, the above composition was applied by means of a paver having a vibrating screed. Placeability was judged to be satisfactory. Temperature of the membrane mix as applied was 295°F. The membrane hot mix composition was placed as a strip approximately 50 feet long by about 10 feet wide, with a nominal thickness of one-fourth inch. The strip was rolled with a 12 ton, 3 wheel tandem wet roller. A wearing course of asphalt concrete was then applied to the membrane layer. The wearing course was placed from a composition having an asphalt content of 5.3 % and a mineral aggregate content of 94.7 %, the mineral aggregate gradation being approximately as follows:

| Sieve Size | % Passing |
|---|---|
| ¾ inch | 100 |
| ½ inch | 97 |
| ⅜ inch | 81 |
| No. 4 | 59 |
| No. 8 | 45 |
| No. 30 | 29 |
| No. 50 | 15 |
| No. 100 | 10 |
| No. 200 | 4 |

The wearing course was placed at 325°F mix temperature and wet rolled to a thickness of about 1½ inches. The temperature of the membrane mix was estimated at between about 60°F to 80°F when the wearing course was applied.

In order to detect penetration of moisture and deicing salts through the surface course and membrane after paving, copper foil strips were taped to the old pavement surface at three locations before paving. Parallel foil strips about 10 feet in length were placed 2 to 3 inches apart and were held in place by tape. The conductive strips were placed near the center of the paving strip. One set of strips, designated No. 1, was used as a control and located in front of the membrane-wearing course. Approximately 2 to 3 feet of this control set was located under the membrane because the paver extended the strips forward to that distance. Although a portion of the control was located under the membrane-wearing course layers, tests have shown that the 7 or 8 foot length of conductive strips left outside of the membrane area would very closely represent the conductivity of the full length strips. Another set of strips, designated No. 2, was located near the front of the paving lane and the third set of strips, designated No. 3, was located at the end of the lane. All strips were held in place by tape and electrical resistance was measured with an ohmeter during and after paving. The results are tabulated below in Table I.

TABLE I

| | Electrical Resistance* in Ohms | | |
|---|---|---|---|
| | No. 1 (control) | No. 2 (under membrane) | No. 3 (under membrane) |
| Before paving | 1,000,000 (max) | 1,000,000 | 1,000,000 |
| After tack coat | 8,000 | 1,000,000 | 1,000,000 |
| After membrane paving | 4,000 | 1,000,000 | 1,000,000 |
| After wearing course paving | 1,400 | 1,000,000 | 4,300 |
| Three days after paving, following one day heavy rainfall | 1,800 | 1,000,000 | 80,000 |
| Approximately 44 days after paving | 1,300 | 1,000,000 | 80,000 |

* The precision of the meter is low above 100,000 ohms due to the logarithmic scale; the maximum readings may have been only about 100,000 or 200,000 ohms.

Before paving, all of the strips showed a maximum scale reading as expected. The strips were covered with plastic sheets during the application of the tack coat to avoid possible pick-up by the wheels of the sprayer truck. However, water from a nearby roller flowed over the control strips (No. 1) causing the resistance to drop to 8,000 ohms. Further penetration of water under the tape holding the control strips in place lowered its resistance to 4,000 ohms when the membrance mix was placed and 1,400 ohms after the surface course was placed. The drop to 4,300 ohms in strips No. 3 after application of the membrane mix indicates penetration of water from the wet roller through local cracks in the membrane. Judging from the final resistance reading of strips No. 3 of 80,000 ohms three days after paving, it can be assumed that the membrane was reheated by the hot surface course and effectively sealed off by rolling of the surface course.

The above tests show that an unprotected pavement has a low electrical resistance, which indicates penetration of water, which could of course lead to roadway deterioration. After about six weeks following paving, the membrane-covered strips had the same high electrical resistance as measured three days after paving, indicating the impermeability of the membrane-wearing course system. Conversely the electrical resistance of the control strips decreased to 1,300 ohms, indicating the presence of additional moisture.

Test installations in areas of severe weather conditions and heavy traffic show no failure in the membrane after more than 3 years of service. In addition to the electrical resistance tests discussed above, periodic visual inspection of the underside of the bridge for leakage or effloresence (salt deposits caused by evaporation of salt solutions) is an effective manner of determining the preformance of the membrane. The presence of new effloresence on the underside of the bridge would indicate salt solutions are leaking through the pavement on the bridge deck.

EXAMPLE II

A membrane hot mix having the composition shown in Table II was laid down over a cleanly swept concrete pavement, previously sprayed with a light tack coat of RS emulsion containing 85 to 100 penetration asphalt and water, using a Barber-Greene paver having an agitator to form a membrane having a nominal thickness of five-eighths inch.

TABLE II

| aggregate | Wt. % |
|---|---|
| stone screenings (crushed) | 35 |
| natural sand (semi-rounded) | 35 |
| mineral filler (rock dust) | 10.5 |
| asphalt (60–70 penetration) | 14.5 |
| asbestos (J-M "ASBALTIC") | 5 |

AGGREGATE GRADATION

| Sieve Size | Aggregate, Percent Passing |
|---|---|
| ⅜inch | 100 |
| 4M | 98.8 |
| 8M | 96.7 |
| 16M | 82.1 |
| 50M | 58.0 |
| 80M | 32.2 |
| 100M | 15.1 |
| 200M | 10.5 |

Hot Mix Temperature - Test measurements showed a range of 340 - 385°F.

To aid traffic flow and the work schedule large portions of the freshly laid membrane sustained heavy traffic from 12 to 36 hours before being covered with an asphalt concrete wear course. Finally, a wearing course was applied as in Example I.

Permeability tests ran on core sections taken from the completed pavement overlay showed that the membrane was impermeable in each core section, whereas in all but one core section the wearing course was permeable.

Visual inspection of the underneath side of the deck 5 months after the paving was completed showed no water seepage indicating an impermeable membrane layer containing no significant cracks.

The above discussion has related primarily to impermeable membranes applied as a hot mix to the pavement surface. However, preformed sheets of the same composition as the hot mix membrane material can be used to provide impermeable membranes, particularly as protection for bridge decks. Such preformed sheets could be of any desired dimensions, such as 2 × 5, and may typically have a thickness of about one-eighth inch or greater. Such sheets, for example, can be made using an extruder, a profile calender or a floor tile mill and can be formed at temperatures, for example, between about 290°F to about 325°F. These preformed sheets may be compacted to the required density in the plant, by calendering means, for example. When placed on a bridge deck or other pavement, these precompacted sheets could be laid by hand with shiplap or overlapped joints. A hot wearing course may then be applied over the sheets joining the sheets together. Membrane layers formed from preformed sheets have proven to be impermeable, durable, and crack-resistant in trial installations in heavy traffic areas for several years.

What is claimed is:

1. An impermeable pavement overlay for protecting an underlying pavement from deterioration, said pavement overlay comprising:

an impermeable membrane layer comprising about 4 to about 10 weight percent asbestos fibers, about 12 to about 20 weight percent asphalt, and about 70 to about 84 weight percent fine aggregate, the asbestos and asphalt being present in amounts to produce an asbestos fiber/asphalt ratio in the range of about 0.3 to about 0.5, said fine aggregate having a gradation such that at least about 70% by weight of said aggregate is capable of passing a No. 10 U.S. Standard Sieve Screen and at least about 10% by weight of said aggregate is capable of passing a No. 200 U.S. Standard Sieve Screen, said membrane having a thickness of from about one-sixteenth inch to about 1 inch; and an asphalt concrete wearing course bonded to said impermeable membrane to provide a wearing layer for said membrane.

2. The pavement overlay as claimed in claim 1 wherein said aggregate is a mineral aggregate.

3. The pavement overlay as claimed in claim 2 wherein said asphalt has a penetration of from about 40 to about 100, said asbestos fibers comprise chrysotile asbestos fibers of Q.A.M.A. Group 5 to Group 7, and wherein said aggregate is graded such that about 80% to about 95% is capable of passing a No. 10 U.S. Standard Sieve Screen and about 10% to about 16% is capable of passing a No. 200 U.S. Standard Sieve Screen.

4. The pavement overlay as claimed in claim 3 wherein said membrane layer comprises the following components, in approximate weight percentages:

| asphalt | 14 – 18% |
| asbestos fiber | 5 – 7% |
| mineral aggregate | 75 – 81% | wherein said asphalt has a penetration of from about 60 to about 85, and wherein said mineral aggregate comprises crushed stone screenings and natural sand.

5. The pavement overlay as claimed in claim 4 wherein said asphalt has a penetration of about 60 to about 70, wherein said asbestos fibers are Q.A.M.A. Group 7 asbestos fibers, wherein said asbestos fiber/asphalt ratio is in range of about 0.35 to about 0.45, wherein said mineral aggregate comprises about 40 to about 60% crushed stone screenings and about 60 to about 40% natural sand, and wherein said mineral aggregate has the following approximate gradation:

| U.S. Standard Sieve Screen | % Passing |
| --- | --- |
| ¼ | 100 |
| No. 10 | 80 – 95 |
| No. 40 | 40 – 65 |
| No. 80 | 20 – 40 |
| No. 200 | 10 – 12 |

6. The pavement overlay as claimed in claim 5 wherein said asphalt concrete wearing course has a thickness of about 1 to about 2 inches.

7. The pavement overlay as claimed in claim 1 wherein said underlying pavement comprises portland cement concrete.

8. The pavement overlay as claimed in claim 1 wherein said underlying pavement comprises a bridge deck.

9. An impermeable pavement covering membrane for protecting an underlying pavement from deterioration comprising a layer having a composition comprising about 4 to about 10 weight percent asbestos fibers, about 12 to about 20 weight percent asphalt and about 70 to about 84 weight percent fine aggregate, the asbestos and asphalt present in amounts to produce an asbestos fiber/asphalt ratio in the range of about 0.3 to about 0.5, said aggregate having a gradation such that at least about 70% by weight of said aggregate is capable of passing a No. 10 U.S. Standard Sieve Screen and at least about 10% by weight of said aggregate is capable of passing a No. 200 U.S. Standard Sieve Screen, said layer having a thickness of from about one-sixteenth inch to about 1 inch, said membrane being capable of covering a pavement surface to provide an impermeable barrier for said pavement surface to protect the same from deterioration, said membrane further being capable of being provided with an overlying asphalt concrete wearing course.

10. The membrane as claimed in claim 9 wherein said aggregate is a mineral aggregate.

11. The membrane as claimed in claim 10 wherein said asphalt has a penetration of from about 40 to about 100, said asbestos fibers comprise short chrysotile asbestos fibers and said aggregate comprises mineral aggregate, at least about 80% of said mineral aggregate being capable of passing a No. 10 U.S. Standard Sieve Screen.

12. The membrane as claimed in claim 11 wherein said mineral aggregate is graded such that about 80 to about 95% is capable of passing a No. 10 U.S. Standard Sieve Screen and about 10% to about 16% is capable of passing a No. 200 U. S. Standard Sieve Screen, wherein said asbestos fibers are Q.A.M.A. Group 5 to Group 7 fibers, and wherein said asphalt has a penetration of from about 60 to about 85.

13. The membrane as claimed in claim 12 wherein said asbestos fiber/asphalt ratio is in the range of about 0.35 to about 0.45, wherein said mineral aggregate comprises angular and round shaped particles and wherein said composition comprises the following components, in approximate weight percentages:

| | |
| --- | --- |
| asphalt | 14 – 18% |
| asbestos fiber | 5 – 7% |
| mineral aggregate | 75 – 81% |

14. The membrane as claimed in claim 13 wherein the thickness is at least one-eighth inch and said mineral aggregate has the following appproximate gradation:

| U.S. Standard Sieve Screen | % Passing |
| --- | --- |
| ¼ inch | 100 |
| No. 10 | 80 – 95 |
| No. 40 | 40 – 65 |
| No. 80 | 20 – 40 |
| No. 200 | 10 – 12 |

15. The membrane as claimed in claim 14 wherein said asphalt has a penetration of about 60 to about 70, wherein said asbestos fibers are Q.A.M.A. Group 7 fibers and wherein said mineral aggregate comprises crushed stone screening and natural sand.

16. The membrane as claimed in claim 15 wherein said mineral aggregate comprises about 40 to about 60% crushed stone screenings and about 60 to about 40% natural sand.

17. A method of protecting a pavement from deterioration comprising:

applying to said pavement a membrane layer comprising about 4 to about 10 weight percent asbestos fibers, about 12 to about 20 weight percent asphalt and about 70 to about 84 weight percent of fine aggregate, said asbestos and said asphalt present in amounts to produce an asbestos fiber/asphalt ratio in the range of about 0.3 to about 0.5, said aggregate having a gradation such that at least about 70% by weight of said aggregate is capable of passing a No. 10 U.S. Standard Sieve Screen and at least about 10% by weight of said aggregate is capable of passing a No. 200 U.S. Standard Sieve screen;

applying a layer of asphalt concrete wearing course over said membrane as a hot mix having a thickness and a temperature sufficient to heat said membrane layer to a temperature sufficiently high that upon compaction of the wearing course the membrane layer is rendered impermeable; and applying a compaction force to said asphalt concrete wearing course, whereby said membrane layer is compacted and rendered impermeable to water.

18. The method as claimed in claim 17 wherein said membrane layer is applied in the form of a hot mix having a mix temperature of at least about 285°F and said asphalt concrete wearing course is applied at a mix temperature of at least about 275°F.

19. The method as claimed in claim 18 wherein said hot mix composition is applied to a depth in the range of about one-eighth inch to about 1 inch.

20. The method as claimed in claim 18 including the additional steps of applying a tack coat to said pavement prior to applying said hot mix composition.

21. The method as claimed in claim 17 wherein said aggregate comprises mineral aggregate, and wherein said asphalt concrete wearing course is applied to a depth of from about 1 inch to about 2 inches.

22. The method as claimed in claim 21 wherein said membrane layer comprises the following components, in approximate weight percentages:

| | |
| --- | --- |
| asphalt | 14 – 18% |
| asbestos fiber | 5 – 7% |
| mineral aggregate | 75 – 81% | and wherein said mineral aggregate comprises crushed stone screenings and natural sand.

23. The method as claimed in claim 22 wherein said asphalt has a penetration of about 60 to about 70, wherein said asbestos fibers comprise Q.A.M.A. Group 7 fibers, wherein said asbestos fiber/asphalt ratio is in the range of about 0.35 to about 0.45, and wherein said fine aggregate has the following approximate gradation:

| U.S. Standard Sieve Screen | % Passing |
| --- | --- |
| ¼ inch | 100 |
| No. 10 | 80 – 95 |
| No. 40 | 40 – 65 |
| No. 80 | 20 – 40 |
| No. 200 | 10 – 16 |

24. The method as claimed in claim 17 wherein said membrane layer is applied to a portland cement concrete pavement.

25. The method as claimed in claim 17 wherein said membrane layer is applied to a bridge deck.

26. The method of claim 23 wherein the fine aggregate contains 10 to 12 percent of particles passing a No. 200 sieve screen.

27. The method of claim 23 wherein said membrane layer is applied in the form of a preformed sheet having a thickness in the range of one-sixteenth to 1 inch, said thickness being sufficient to produce an impermeable membrane over said pavement.

* * * * *

UNITED STATES PATENT AND TRADEMARK OFFICE
CERTIFICATE OF CORRECTION

PATENT NO. : 3,870,426
DATED : March 11, 1975
INVENTOR(S) : Kietzman, J. H. and Tocci, M. P.

It is certified that error appears in the above-identified patent and that said Letters Patent are hereby corrected as shown below:

Column 2, line 11 "sufface" has been left out

Column 2, line 23 should read "or" delete "of"

Column 2 line 24 should read "coal-tar" not "coaltar"

Column 2, line 63 "impermeability" was misspelled

Column 3, line 56 "asbestos asphalt" is two words not one

Column 4, line 19 should read "by" delete "be"

Column 4, line 56 asphalt - 12-20% "12" was left out

Column 5, line 20 "A specific preferred embodiment is as follows", was left out before the chart.

Column 6, line 11 delete line 11, duplicate of line 10

Column 6, line 29 should read "or" delete "to"

Column 9, line 22 "used" has been left out

Column 12, line 1 "2 x 5" should read 2' x 5'

Column 14, line 16 should read "screenings" not "screening"

Column 14 (CLAIM 21) should read "The method as claimed in Claim 17 wherein said asphalt has a penetration of about 40 to about 100, wherein said asbestos fibers comprise chrysotile asbestos fibers of QAMA group 5 to group 7 wherein ........etc. ect.

Signed and Sealed this fourteenth Day of October 1975

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,870,426    Dated  March 11, 1975

Inventor(s) John Howard Kietzman et al.

It is certified that error appears in the above-identified patent and that said Letters Patent are hereby corrected as shown below:

Column 2, line 67, after "flow during" insert -- hot --.

Signed and Sealed this sixteenth Day of December 1975

[SEAL]

Attest:

RUTH C. MASON
Attesting Officer

C. MARSHALL DANN
Commissioner of Patents and Trademarks